Sept. 22, 1959 M. D. NELSON 2,905,857

REGULATED HIGH VOLTAGE SUPPLIES

Filed March 24, 1958

INVENTOR.
MORRIS D. NELSON

BY

W. H. Sprague

ATTORNEY 2,905,857

REGULATED HIGH VOLTAGE SUPPLIES

Morris D. Nelson, New York, N.Y., assignor to Radio Corporation of America, a corporation of Delaware Application March 24, 1958, Serial No. 723,375
4 Claims. (Cl. 315—27)

Figures 1, 2:
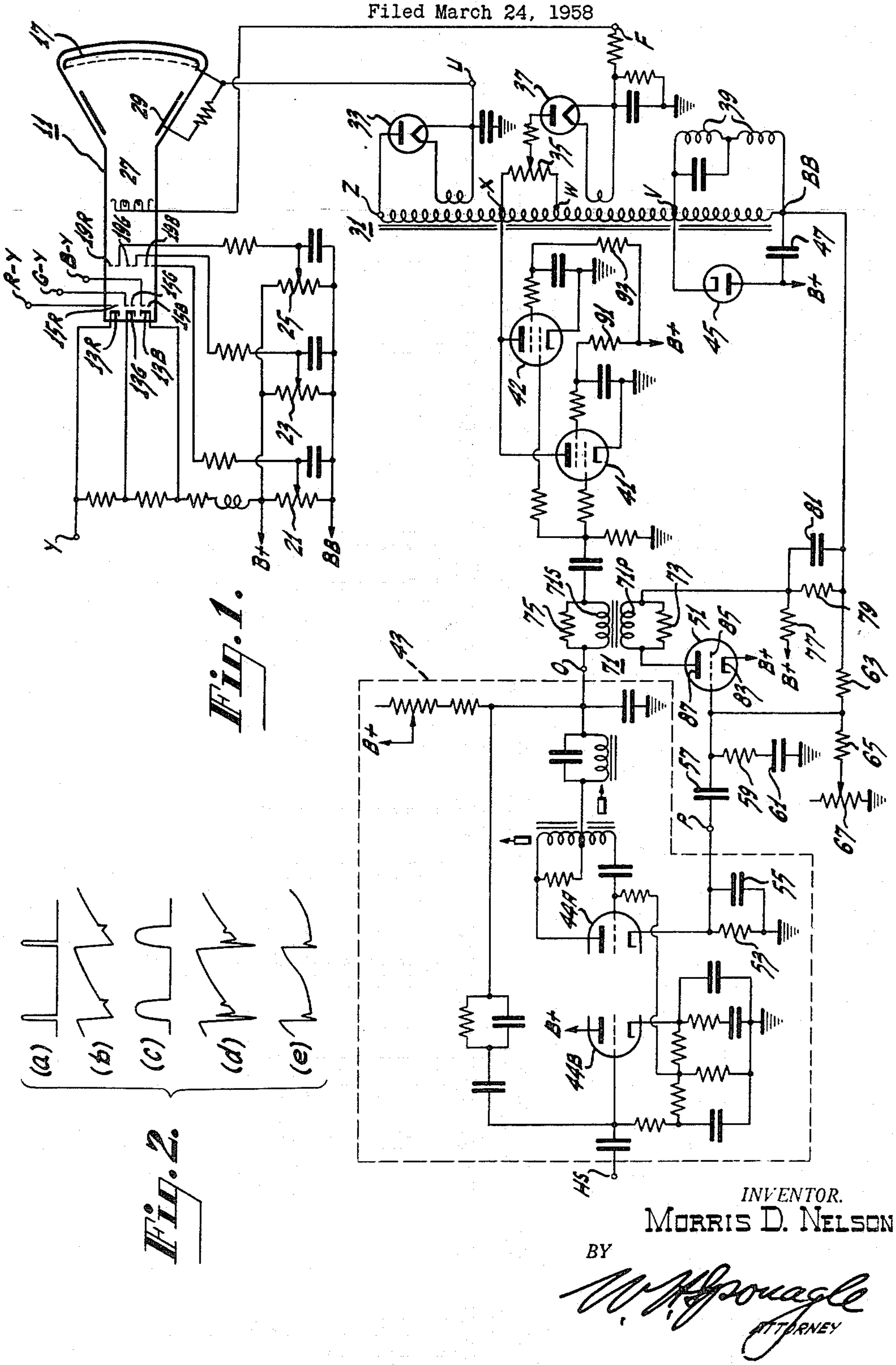

This invention relates to regulated power supply circuits and more particularly to flyback type high voltage power supply circuits useful in supplying the high voltage requirements of a television receiver.

It has been become more or less a general practice in the monochrome television art to obtain the high voltage required for the final accelerating electrode of a receiver's kinescope from a pulse type supply, in which high voltages are developed through rectification of the high amplitude, transient, flyback pulses appearing in the receiver's horizontal output transformer during retrace periods of the line scanning cycle, when cutoff of the horizontal output tube causes a sudden collapse of the magnetic field in the horizontal deflection yoke. Similarly, the development of high voltages for the final accelerating electrode, or so-called ultor electrode, of presently contemplated color kinescopes has been considered as calling for the use of such flyback pulse type supplies. However, the high voltage requirements of a typical color kinescope are greater in magnitude, more critical as to regulation, and generally more demanding than the comparable supply requirements of the monochrome kinescope. It has thus been generally recognized that the ultor supply for a color kinescope requires the use of an active voltage regulating device to achieve the requisite stability of the supplied ultor voltage.

The present invention is directed toward simplified and economical apparatus for, and methods of, regulating the output of a flyback type high voltage supply, suitable for satisfying the requirements of a color television receiver.

The presently conventional high voltage supply used in commercial color television receivers involves the use of a high voltage regulator tube having its space discharge path shunted across the output circuit of the high voltage rectifier. Variations in the output are sensed by sampling the high voltage output itself, or some related voltage such as the so-called B-boost voltage, and used to control the shunt impedance presented by the regulator tube such as to compensate for the variations. While use of such a regulating arrangement has proved quite satisfactory in operation, it requires the use of a costly high voltage tube, which is usually the most expensive tube in the receiver apart from the kinescope. In my U.S. Patent No. 2,751,520, regulated high voltage supply systems are disclosed in which the need for an expensive high voltage regulator tube is eliminated. The systems of my aforesaid patent involve rendering the horizontal deflection output tube conducting to a controllable extent during a portion of the flyback interval, whereby the deflection output tube effectively serves as a controllable dummy load on the high voltage supply. The degree of conduction of the output tube during the flyback interval portion is controlled by applying, in addition to the usual deflection waveform, a pulse having an amplitude responsive to variations in the supply output. The present invention is directed toward improvements of the circuits disclosed in my aforesaid patent.

In accordance with an embodiment of the present invention, the controllable amplitude pulse which causes conduction of the horizontal output tube during a flyback interval portion is added to the usual deflection waveform input to said tube via a transformer having a secondary winding inserted in series in the deflection waveform input path. The transformer is designed and adjusted to introduce a pulse delay of a magnitude such that the deflection waveform retrace portion is completed before the pulse is injected. The injected pulse thus causes output tube conduction to start shortly after (e.g., about one microsecond after) the flyback pulse initiation but before all energy transfer to the deflection transformer winding is completed. It has been found experimentally that if the pulse is not delayed enough before it is combined with the sawtooth input driving wave, it blends with the retrace slope of the sawtooth wave and merely delays the initiation of the flyback pulse, resulting in poor regulation. Conversely, if the pulse is delayed too long, the picture width decreases excessively, the operation of the deflection circuit is inefficient and the regulation is poor. An advantage of the transformer insertion technique is achievement of the proper pulse delay.

In accordance with another feature of the present invention, a simplified system for supplying the controlled amplitude pulse is provided, utilizing a single tube, which receives on its control grid pulses generated during the retrace interval, for example, in the cathode circuit of the horizontal deflection oscillator, and which derives bias for said control grid from the B-boost potential source associated with the horizontal output transformer. The bias is preferably adjusted such that the tube will conduct enough to produce a pulse in its plate circuit of an amplitude that will just barely cause horizontal output tube conduction when the B-boost voltage value is that developed by the deflection circuit when the beam current is maximum. When the kinescope beam current drops below this maximum, both the high voltage and the B-boost voltage will tend to rise. This causes greater amplification of the pulse in proportion to the rise in B-boost voltage.

In accordance with another feature of the present invention, a pair of deflection output tubes in parallel is substituted for the conventional single output tube whereby to provide the increased dissipation capability desired of the output tube in its function as a pulse regulating dummy load.

A primary object of the present invention is to provide novel and improved regulated high voltage supplies of the flyback type.

An additional object of the present invention is to provide a simplified and economical regulated high voltage supply for television receiver apparatus, wherein the need for expensive high voltage regulator tubes is eliminated.

A further object of the present invention is to provide an improved regulated high voltage supply for television receivers of the type in which the receiver's horizontal deflection output tube serves as a pulse regulating dummy load, means for accurately timing the output tube performance of such a dummy load function being provided therein.

Other objects and advantages of the present invention will become readily apparent to those skilled in the art after a reading of the following detailed description and an inspection of the accompanying drawing in which:

Figure 1 illustrates schematically a portion of a color television receiver incorporating a regulated high voltage supply in accordance with an embodiment of the present invention; and Figure 2 illustrates graphically voltage and current waveforms of aid in explaining the operation of the circuits schematically illustrated in Figure 1.

In Figure 1, a color kinescope 11, which may be of the well-known shadow mask type, is schematically illustrated. The cathodes 13R, 13G and 13B of the color kinescope 11 are connected to a common input terminal Y. The respective control grids 15R, 15G and 15B are connected to respectively separate input terminals R—Y, G—Y and B—Y. A color television receiver, such as, for example, one generally corresponding to RCA Victor Model No. 21–CD–8725, provides suitable circuitry for delivering to the input terminal Y a luminance signal and to the input terminals R—Y, G—Y and B—Y respective color difference signals, which are combined with the luminance signal by the color kinescope 11 to develop on the target structure 17 a color image reproduction. The color kinescope 11 also includes respective accelerating or screen electrodes 19R, 19G and 19B, which receive suitable energizing potentials via screen bias potentiometers 21, 23 and 25, respectively. The color kinescope 11 also includes a focusing electrode structure 27 and an ultor electrode structure 29, these electrode structures deriving respective operating potentials from supply terminals F and U, respectively.

The respective operating potentials appearing at terminals F and U are developed in a flyback pulse type power supply associated with the output transformer 31 of the receiver's horizontal deflection system. Flyback pulses appearing in the transformer 31 during retrace periods of the horizontal deflection cycle are rectified by diode 33, the anode of which is connected to the high potential terminal Z of the output transformer 31, and the rectified output appearing at the cathode of diode 33 is delivered to terminal U. Flyback pulses of adjustable amplitude, derived from potentiometer 35 which is connected across intermediate terminals X and W of the transformer 31, are rectified by diode 37, and the rectified output appearing at the cathode of diode 37 is delivered to terminal F. The present invention is directed toward a relatively inexpensive, yet satisfactory, system for effecting regulation of the voltages thus delivered to terminals U and F.

Before proceeding with an explanation of the voltage regulating system, it will be necessary to consider generally the operation of the receiver's horizontal deflection system. Deflection currents of suitable line frequency and sawtooth waveform are caused to flow in the horizontal deflection yoke windings 39, connected between intermediate terminal V and low potential terminal BB of the transformer 31, by the supplying of a suitable sawtooth voltage waveform to the control grids of the parallel connected output tubes 41 and 42, the anodes of which are connected to intermediate terminal X of the transformer 31. The sawtooth voltage waveform is generated by a deflection wave generator 43 of the well-known "synchroguide" type, and including a triode section **44*a* functioning as a blocking oscillator and a triode section 44*b* functioning as a frequency control device responsive to the horizontal synchronizing pulse component of received composite signals supplied by the receiver's sync separation circuits to the terminal HS. The substantially sawtooth voltage waveform developed by generator 43** and appearing at the generator output terminal O is illustrated by waveform (*b*) in Figure 2.

Utilizing well-known reaction scanning principles, the illustrated deflection system also includes a conventional damper tube, diode 45, the cathode of diode 45 being connected to intermediate terminal V of transformer 31, and the anode of diode 45 being connected to the receiver's source of B+ potential. In accordance with conventional power conservation principles, a capacitor 47 is coupled between the anode of damper diode 45 and the low potential terminal BB of the transformer 31, the charge built up on capacitor 47 in response to the periodic flow of current through the damper diode 45 effectively adding to the B+ supply potential to provide a boosted supply potential (i.e., a so-called B-boost potential) for the anodes of the output tubes 41 and 42.

To effect regulation of the voltages supplied to terminals U and F, in accordance with the principles of the present invention, a regulator tube 51 is provided. The control grid 85 of tube 51 is coupled via capacitor 57 to a pulse input terminal P, to which is supplied a series of relatively sharp pulses coinciding with the retrace or discharge portion of the deflection voltage waveform (*b*), such pulses being illustrated by waveform (*a*) of Figure 2. Illustratively, the desired series of pulses are obtained across the parallel combination of resistor 53 and capacitor 55, the parallel combination being connected between the cathode of the blocking oscillator tube **44*a* and a point of reference potential. The pulses are generated across the parallel combination by the periodic conduction of tube 44*a***, the same periodic conduction providing the discharge portion of the waveform (*b*).

A variable D.C. bias for the control grid 85 is provided by means of a voltage divider connected between terminal BB and a point of ground potential, the voltage divider comprising resistor 63, resistor 65 and adjustable resistor 67 in series, with the control grid 85 being directly connected to the junction of resistors 63 and 65. A series RC network, comprising resistor 59 and capacitor 61 in series, is connected between the control grid 85 and a point of ground potential, the time constant of the series RC network being chosen to minimize hunting in the regulator circuit. The cathode 83 of tube 51 is connected to a point of B+ potential.

The anode 87 of tube 51 is provided with operating potential via connection to the junction between resistor 77 and resistor 79, said resistors comprising a voltage divider connected between terminal BB and a point of B+ potential, a bypass capacitor 81 shunting resistor 79. The connection from anode 87 to the latter voltage divider is made through a load comprising the primary winding 71P of a transformer 71, the winding 71P being shunted by a damping resistor 73. The parallel combination of a damping resistor 75 and the secondary winding 71S of the transformer 71 is included in series in the deflection voltage waveform signal path between generator output terminal "O" and the control grids of output tubes 41 and 42.

In operation, tube 51 serves to amplify the pulses of waveform (*a*) appearing at terminal P to an extent determined by the amplitude of the divided B-boost potential applied to the control grid via the voltage divider 63, 65, 67. The amplified pulse is inverted and added to the deflection voltage waveform (*b*) by means of the transformer 71. The constants of the transformer 71 are chosen and/or adjusted to introduce a predetermined delay of the inserted pulse such that the pulse occurs after the conclusion of the downward retrace slope of the sawtooth voltage waveform (*b*). The combined waveform appearing at the control grids of output tubes 41 and 42 is illustratively shown by waveform (*d*) of Figure 2. The effect on the plate current of output tubes 41 and 42 of the addition of the suitably delayed pulse to the sawtooth voltage wave on the grids thereof, as illustrated by current waveform (*e*) of Figure 2, is that the output tubes are rendered conducting again for a short period just following the rapid cutoff thereof by the discharge portion of the applied sawtooth voltage wave. Waveform (*c*) of Figure 2 is illustrative of the flyback pulse voltage waveforms appearing (with respectively different amplitudes) at terminals Z, X and W of the output transformer 31. As indicated by comparison of waveforms (*c*) and (*e*), the inserted pulse-induced conduction of output tubes 41 and 42 occurs for a brief period during an initial portion of each flyback pulse.

It will be appreciated that by virtue of such conduction during the occurrence of the flyback pulse, the output tubes 41 and 42 provide an additional "dummy" load on the flyback pulse supply, such dummy load being variable in accordance with the amplitude of the inserted pulse as variably amplified by tube 51, such variable amplification being in turn proportional to variations in the B-boost potential developed at terminal BB. Since a change in the flyback supply output voltages due to variations in loading or the like will be accompanied by a corresponding change in B-boost potential in the same direction, it will be readily appreciated that the dummy load provided by output tubes 41 and 42 thus varies in accordance with the high voltage supply output variations, and in a direction tending to oppose such variation.

From the foregoing description of the regulating circuits and their principles of operation, it will be appreciated that the present invention provides a relatively simple and inexpensive system for achieving high voltage supply regulation. The elimination of the need for a regulator tube operating at high voltages of the order of the ultor voltage is an advantage easily appreciated. Another advantage of the disclosed pulse insertion technique utilizing transformer 71 is the convenient achievement of the proper delay for the inserted pulse. As noted previously, it has been found experimentally that if the pulse is not delayed enough before it is combined with the sawtooth voltage waveform, it blends with the retrace slope of the sawtooth and merely delays the initiation of the flyback pulse resulting in poor regulation; conversely, if the pulse is delayed too long, the picture width decreases excessively, the operation of the deflection circuit is inefficient and the regulation is poor. It has been found that a desirable period of delay, readily achieved by means of transformer 71, is such that the output tubes are caused to conduct again at about one microsecond after cutoff.

The windings of transformer 71 preferably have low distributed capacitance so that the wave shape of the sawtooth voltage waveform is not adversely affected. The damping resistors 73 and 75, connected across the primary and secondary windings 71P and 71S, respectively, are provided to reduce the ringing introduced into the sawtooth driving wave by the loose coupling between the transformer windings. Excessive damping should be avoided since it reduces the regulation sensitivity.

It will be noted that the adjustable resistor 67 in the B-boost voltage divider provides a range adjustment for the regulating system. The preferred setting of resistor 67 is such that at maximum kinescope beam current (i.e., maximum loading on the high voltage supply), tube 51 conducts enough to produce an inserted pulse of an amplitude that just barely causes output tubes 41 and 42 to conduct. When the kinescope beam current drops below the maximum value, the ultor voltage and the B-boost voltage tend to rise. This causes tube 51 to conduct more and to further amplify the input pulse in proportion to the rise in B-boost voltage. The dummy load provided by tubes 41 and 42 accordingly increases to cause an output voltage decrease tending to oppose the initiating output voltage increase.

It should be noted that, while a pair of parallel connected output tubes 41 and 42 is utilized in the illustrated embodiment, a single output tube may be substituted therefor. Use of the parallel output tube pair is however preferred from a consideration of output tube life. Maximum plate dissipation in the output tube in performance of its dummy load function occurs when the kinescope draws no current. Although kinescope operation with no beam current occurs only occasionally, excessive dissipation under this condition may cause decreased output tube life. With the use of two output tubes, the plate dissipation, due to the deflection function only, is lower than for conventional one-tube circuits, for two reasons. The peak plate current is divided between two tubes and therefore the total dissipation is similarly divided. Also, the plate-voltage drop during peak plate current in each tube is reduced because the current is halved which results in lower total dissipation. The additional dissipation capability is utilized for regulation.

It will be noted that, in the illustrated embodiment, the screen grids of the output tubes 41 and 42 are supplied via separate screen dropping resistors 91 and 93. Use of this screen grid voltage supply arrangement for the output tube pair presents the advantage of equalizing the screen dissipation in the output tubes, but does not assure equal plate dissipation. An alternative screen grid voltage supply arrangement is to parallel the screen grids of the output tube pair with a common dropping resistor, such alternative arrangement tending to equalize plate dissipation, but not screen dissipation, in the output tube pair.

In a particular working embodiment of the disclosed regulating system, the transformer 71 comprised a pair of prewound windings of #38 SSE wire of 400 turns each spaced apart ⅛" on a 9/32" coil form, with a ¼" ferrite core, 1½" long, the inductance exhibited by each winding being approximately 5.8 millihenries; other components of said working embodiment comprised:

| | |
|---|---|
| Color kinescope **11** | 21AXP22A |
| Output transformer **31** | RCA XD2617C |
| HV rectifier diode **33** | 3A3 |
| Potentiometer **35** ohms | 100,000 |
| Focus rectifier diode **37** | 1V2 |
| Horiz. output tubes **41, 42** | 6DQ6A |
| Horiz. oscillator and control tube **44A, 44B** | 6CG7 |
| Damper diode **45** | 6AU4GTA |
| B-boost capacitor **47** microfarads | 10 |
| Regulator tube **51** | 6U8 |
| Resistor **53** ohms | 150 |
| Capacitor **55** microfarad | .01 |
| Capacitor **57** do | .01 |
| Resistor **59** ohms | 4700 |
| Capacitor **61** microfarad | .5 |
| Resistor **63** ohms | 270,000 |
| Resistor **65** do | 220,000 |
| Resistor **67** do | 50,000 |
| Resistor **73** do | 27,000 |
| Resistor **75** do | 27,000 |
| Resistor **77** do | 220,000 |
| Resistor **79** do | 56,000 |
| Capacitor **81** microfarad | .1 |
| Resistor **91** ohms | 4700+4700=9400 |
| Resistor **93** do | 4700+4700=9400 |

It will be appreciated that the foregoing specific component values and types are given by way of example only, and the present invention should not be considered to be limited to use of such specific components.

What is claimed is:

1. In a high voltage supply including a generator of a substantially sawtooth voltage wave having a discharge portion, an output transformer, an output tube, a signal path for said sawtooth voltage wave coupled between said generator and said output tube, said output tube responding to the discharge portion of said sawtooth voltage wave to cause the generation of flyback pulses in said output transformer, and a high voltage rectifier responsive to said flyback pulses for supplying an output voltage to a load, the combination comprising means for generating a pulse substantially coinciding in time with the discharge portion of said sawtooth wave, an amplifying device coupled to said generating means for amplifying said pulse, means coupled to said amplifying device for varying the gain of said amplifying device in response to variations in said output voltage, and means including an impedance device in series in said signal path for adding the amplified pulse output of said amplifying device to said sawtooth voltage wave in predetermined delayed time relationship to said discharge portion, said last-named means comprising a transformer having primary and secondary windings, the primary winding of said transformer being responsive to the amplified pulse output of said amplifying device, and the secondary winding of said transformer constituting said impedance device in said signal path.

2. In a television receiver, the combination comprising a source of substantially sawtooth voltage wave having a retrace portion, a deflection output tube, a deflection output transformer coupled to said output tube, means for coupling said output tube to said source, said output tube being rendered non-conducting by the retrace portion of said sawtooth voltage wave to initiate development of flyback pulses in said output transformer, means coupled to said output transformer for rectifying said flyback pulses to develop a unidirectional output voltage, means coupled to said source for deriving a pulse substantially coinciding in time with the discharge portion of said sawtooth wave, means coupled to said deriving means for variably amplifying said pulse, the amplification of said pulse by said amplifying means varying in accordance with variations in said output voltage, a transformer having a primary winding and a secondary winding, said primary winding being responsive to the output of said variable amplifying means, said secondary winding being included in said means for coupling said output tube to said source, said transformer introducing delay of said pulse relative to the retrace portion of said sawtooth wave such that said pulse appears in said secondary winding after the completion of said retrace portion.

3. Apparatus in accordance with claim 2 wherein said receiver also includes a power recovery system coupled to said transformer for developing a B-boost potential and wherein the variable amplification of said pulse by said amplifying means is caused to respond to variations in said output voltage by means comprising a voltage divider, means for applying said B-boost potential across said voltage divider, and means for coupling said amplifying means to an intermediate point on said voltage divider.

4. In a television receiver including a deflection output tube periodically rendered non-conducting, an output transformer adapted to be energized by said output tube and developing flyback pulses in response to the rendering of said output tube non-conductive, and a power recovery system associated with said transformer for developing a B-boost potential, the combination comprising a source of a series of pulses, a pulse amplifying device coupled to said source, means for controlling the gain of said pulse amplifying device in accordance with variations in said B-boost potential, means coupled to said pulse amplifying device for applying the amplified pulse output thereof to said deflection output tube with a polarity tending to render said output tube conducting and means included in said applying means for delaying the amplified pulse such that it renders said output tube conducting substantially one microsecond after said output tube is rendered non-conducting.

References Cited in the file of this patent

UNITED STATES PATENTS

| | | |
|---|---|---|
| 2,701,851 | Palmer | Feb. 8, 1955 |
| 2,742,591 | Proctor | Apr. 17, 1956 |
| 2,790,108 | Bigelow | Apr. 23, 1957 |